THOMAS M. CHAPMAN.
Improvement in Saw-Filing Machines.
No. 123,151. Patented Jan. 30, 1872.
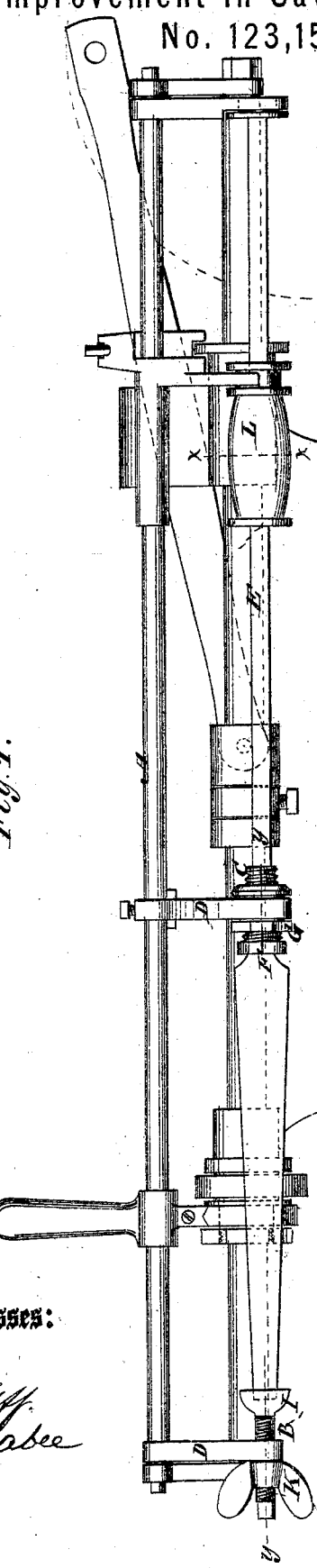
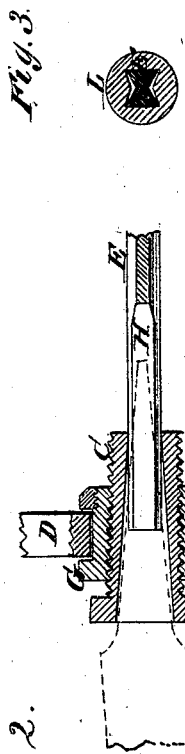
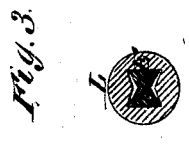
Witnesses:
E. Wolff
Geo. W. Mabee
Inventor:
T. M. Chapman
per Munn & Co
Attorneys.

123,151

UNITED STATES PATENT OFFICE.

THOMAS M. CHAPMAN, OF OLDTOWN, MAINE.

IMPROVEMENT IN SAW-FILING MACHINES.

Specification forming part of Letters Patent No. 123,151, dated January 30, 1872.

Specification describing certain Improvements in Saw-Filing Machine, invented by THOMAS M. CHAPMAN, of Oldtown, in the county of Penobscot and State of Maine.

The invention will first be fully described and then clearly pointed out in the claim.

Figure 1 is a side elevation of the machine which is the subject of the present improvements. Fig. 2 is a sectional elevation of the file-holding devices arranged according to my improvements, the section being taken on the line $y\,y$ of Fig. 1, and Fig. 3 is a transverse section on the line $x\,x$.

A is an oscillating and reciprocating rod, which holds the file-holding and adjusting-nuts or screws B C; also the file-turning rod E, by means of the arms D. Now, as the shanks of the files differ materially in thickness and width so that it is difficult to hold them with a solid-socketed nut, I propose to make said nut C in two parts, divided longitudinally, as shown at F; and I make it long and tapered, and fit it in an internally-threaded ferrule, G, which is fitted in the arm D, so as to turn readily, but not to move endwise, by which the sectional nut may be screwed up snugly upon shanks varying considerably in shape and size. For adapting the apparatus for adjusting to files differing considerably in length I make the rod E for turning them with a long slot in the end for the tang, as indicated at H, and construct the hole in the nut and said rod in such relative sizes that the nut may slide along the rod, or the latter may slide forward and back in the nut; and the arm D is made adjustable on the rod A so that the tang of the file may enter said slot H more or less, as required. The holder I for the point of the file is made adjustable also for long or short files by the adjusting-screw B, on the end of which it is mounted, said screw screwing forward and back through the arm D, and being secured at any point by the jam-nut K. For preventing the heating of the nut or handle L, by which the rod is turned to adjust the file to the saw-teeth, I form a deep groove in two or more of the sides of the rod, as shown at Fig. 3, and shape the nut to correspond so as to greatly increase the wearing surface, and thereby lessen the tendency to heat by friction. Instead of adjusting the holder I by a screw a smooth shank in the place of the screw may be used with a split arm, D, arranged in the form of clamping-jaws with a binding-screw for clamping said smooth shank and holding it at any point.

Having thus described my invention, I claim as new and desire to secure by Letters Patent—

1. The sectional tapered hollow shank-holding nut C, internally-threaded thimble G, and arm D, combined and arranged substantially as specified.

2. The arm D, adjustable on rod A, combined as described, with ferrule G, nut C, and slotted rod E H, to thereby give a greater range for the reception of various sizes of files.

3. The file-turning rod E having grooved sides, and the hole of the handle-nut L, fitted thereon, all substantially as specified.

THOS. M. CHAPMAN.

Witnesses:
STEPHEN S. HAYNES,
FOSTER WOOD.